United States Patent [19]

Kubo et al.

[11] Patent Number: 5,206,275

[45] Date of Patent: Apr. 27, 1993

[54] EXPANDABLE POWDER COATING COMPOSITION

[75] Inventors: Masao Kubo, Koshigaya; Atumi Nakamura, Abiko; Tetsuo Miyake, Saitama; Katsuji Kitagawa, Kasukabe; Katsuya Sano, Chiryu; Kiyoshi Kittaka, Okazaki; Tetsuya Sakakibara, Gamagouri, all of Japan

[73] Assignee: Somar Corporation, Japan

[21] Appl. No.: 710,203

[22] Filed: Jun. 6, 1991

[30] Foreign Application Priority Data

Jun. 8, 1990 [JP] Japan .................................. 2-150701

[51] Int. Cl.$^5$ ................................................ C08K 5/15
[52] U.S. Cl. ..................................... 524/114; 524/141; 524/297; 521/107; 521/130
[58] Field of Search ........................ 524/114, 141, 297; 521/107, 130

[56] References Cited

U.S. PATENT DOCUMENTS 3,046,237  7/1962  Rosenfelder et al. ............... 524/114
3,117,113  1/1964  Tudor .................................. 524/114
5,047,439  9/1991  Sano et al. ............................ 521/78

OTHER PUBLICATIONS

Database WPIL, No. 90-088 460, Derwent Publications, Abstract JP-A-02-043 273.
Database WPIL, No. 89-336 182, Derwent Publications, Abstract JP-A-01-250 690.
Database WPIL, No. 81-10 593, Derwent Publications, Abstract JP-A-55-157 665.

Primary Examiner—Paul R. Michl
Assistant Examiner—John J. Guarriello
Attorney, Agent, or Firm—Lorusso & Loud

[57] ABSTRACT

An expandable, powder coating composition is disclosed which includes (a) a thermoplastic resin containing a hydroxyl group-containing polymer, (b) a crosslinking agent containing a polyisocyanate compound which is capable crosslinking the thermoplastic resin, (c) a blowing agent, and (d) a mixture of a solid plasticizer such as triphenyl phosphate and a liquid plasticizer such as dioctyl phthalate.

10 Claims, No Drawings

EXPANDABLE POWDER COATING COMPOSITION

BACKGROUND OF THE INVENTION

This invention relates to an expandable, powder coating composition and to a composite material obtained by forming a heat-insulating, foamed resin coat over a surface of a substrate such as a metal tube or a box.

DESCRIPTION OF THE PRIOR ART

Metal tubes of air conditioners used in automobiles, electric cars, buildings, etc. are generally provided with heat-insulating sheaths of foamed resins. Known foamed resin sheaths have been produced by extrusion or by molding in a mold cavity. The conventional methods, however, have problems because sheaths with various different shapes must be prepared so as to conform to various outer shapes of metal tubes, because it is difficult to mount the resulting sheaths on tubes with complicated shapes and because clearance between the sheath and the tube is unavoidable, thus causing a reduction in heat-insulating efficiency. These also apply to a heat-insulating lining of a container or box to be used, for example, for containing a heating or cooling medium.

SUMMARY OF THE INVENTION

With the foregoing problems of the conventional method in view, the present invention provides an expandable, powder coating composition useful for forming a foamed, heat-insulating layer over the surface of a substrate. In accordance with the present invention there is provided an expandable, powder coating composition comprising:

(a) a thermoplastic resin containing a hydroxyl group-containing polymer;

(b) cross-linking agent containing a polyisocyanate compound which is capable of reacting with the hydroxyl groups of said polymer at a temperature higher than the melting point of said thermoplastic resin to crosslink said polymer and which is solid at room temperature;

(c) a blowing agent capable of decomposing and generating a gas when heated to a temperature higher than the melting point of said thermoplastic resin; and (d) a mixture of solid and liquid plasticizers, said solid plasticizer being selected from the group consisting of triphenyl phosphate and a first ester having the following general formula:

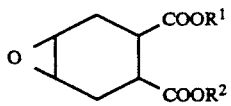

wherein $R^1$ and $R^2$ represent independently from each other an alkyl group having 12 or more carbon atoms, said liquid plasticizer being selected from the group consisting of dioctyl phthalate and a second ester having the following general formula:

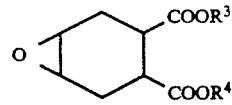

wherein $R^3$ and $R^4$ represent independently from each other an alkyl group having 1-10 carbon atoms.

In another aspect the present invention provides a composite material obtained by a method comprising powder coating a substrate with the above powder coating composition at a temperature sufficient to decompose said blowing agent and to cause said coating composition to expand, thereby to form a layer of an expanded resin over the surface of the substrate.

The powder coating composition according to the present invention gives a foamed coat which is closely contacted with the surface of the substrate, which has excellent heat-insulating property, cushioning property, heat resistance, surface hardness and surface slippage. Further, the powder coating composition has excellent capability of depositing and accumulating on to a surface to be coated so that a thick coating may be obtained within a short period of time. Moreover, the foamed coat has reduced moisture absorption or hot water absorption so that the heat or sound conductivity of the coating is not deteriorated even when it is used outdoors. The low moisture absorption of the coating can also prevent the formation of dew. The coating is also stable and does not deteriorate the surface on which it is provided.

The present invention will now be described in detail below.

The thermoplastic resin which serves, upon expansion, as a structural material is a hydroxyl group-containing polymer or a mixed polymer containing same. Examples of suitable hydroxyl group-containing polymer include polyvinyl alcohols, partially saponified ethylene/vinyl acetate copolymers, ethylene/vinyl alcohol copolymers, phenoxy resins and polyvinyl butyral resins. Such polymers preferably have a weight average molecular weight of about 10,000–100,000, more preferably about 35,000–80,000.

For the purpose of improving bonding of a foamed layer obtained from the coating composition to a substrate, it is preferred that the hydroxyl group-containing polymer further contain carboxyl groups. Such a polymer containing both hydroxyl and carboxyl groups can be obtained by conducting the polymerization for the production of the above hydroxyl group-containing polymer in the presence of an unsaturated carboxylic acid, such as maleic anhydride, acrylic acid, methacrylic acid or itaconic acid. Alternatively, grafting of such an unsaturated carboxylic acid onto the above hydroxyl group-containing polymer can give a polymer containing both hydroxyl and carboxyl groups.

The thermoplastic resin may further contain a hydroxyl group-free polymer such as a polyolefin, an ethylene/vinyl acetate copolymer, a polyvinyl chloride or an ethylene/ethyl acrylate copolymer. Examples of suitable polyolefins include polyethylenes, ethylene/propylene copolymers, polypropylenes and polybutene-1. When such a hydroxyl group-free polymer is used, the amount of the hydroxyl group-containing polymer in the thermoplastic resin is generally 10 % by weight or more, preferably 20 % by weight or more.

The thermoplastic resin is preferably used in conjunction with a viscosity controlling agent which can control the viscosity of the coating composition in a molten state to facilitate the expansion thereof. A polyol compound which is solid or semi-solid at room temperature is preferably used as the viscosity controlling agent.

Illustrative of suitable polyol compounds are: ether-containing diols having the following general formula (I):

$$HO(C_mH_{2m}O)_nH \qquad (I)$$

wherein m is a positive integer, preferably of 2-6, more preferably 3-4 and n is an integer of at least 2, preferably 4-6,
ester-containing diols having the following general formula (II):

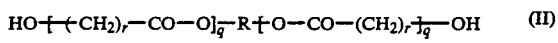

$$HO[(CH_2)_r-CO-O]_q-R[O-CO-(CH_2)_r]_q-OH \qquad (II)$$

wherein R stands for an alkylene having 2-10 carbon atoms, q is an integer of 1 or more, preferably 3-4, and r is an integer of 1 or more, preferably 3-7, and
polymers having a saturated hydrocarbon skeleton and a molecular weight of 1000-5000 and containing 1.5-3 terminal hydroxyl groups. The polyol compound is used in an amount of 5-100 parts by weight, preferably 20-60 parts by weight per 100 parts by weight of the thermoplastic resin. The molecular weight of the polyol compound is generally about 300-6,000, preferably about 2,000-5,000.

Any polyisocyanate compound which is solid at room temperature and which has two or more isocyanate groups may be used as the cross-linking agent in the coating composition of the present invention. Examples of the polyisocyanate compounds include phenylenediisocyanate, tolylenediisocyante, biphenylenediisocyanate and diphenylmethane-p,p-diisocyanate. Blocked polyisocyanate compounds having their isocyanate groups blocked with an active hydrogen-containing compound such as an amide, a lactam, phenol, an alcohol, an oxyme or a mercaptane can also be suitably used for the purpose of the present invention. ε-Caprolactam is a particularly preferred active hydrogen-containing compound. For example, a compound having the formula (I):

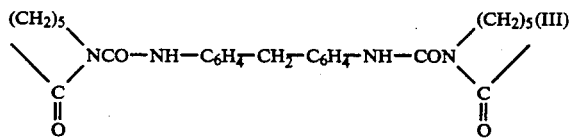

may be suitably used as the cross-linking agent.

The polyisocyante compound or its blocked derivative can react with the hydroxyl groups of the hydroxyl group-containing polymer to cross-link same. It can also react with the polyol compound which is optionally contained in the coating composition to form high molecular weight compounds. The polyisocyanate compound is used in an amount providing a ratio (NCO/OH) of equivalents of the isocyanate group per equivalent of the hydroxyl group in the composition of less than 1, preferably 0.03-0.8.

The cross-linking agent may further contain an organic peroxide in an amount of 0.5-7.0 parts by weight, preferably 1.0-4.0 parts by weight per 100 parts by weight of the thermoplastic resin. The organic peroxide may be, for example, dicumyl peroxide, bis(t-butylperoxy)isopropylbenzene, dimethyldi(t-butylperoxy)hexane or dimethyldi(t-butylperoxy)hexyne.

The blowing agent may be an organic one such as azodicarbonamide, 2,2'-azobisisobutyronitrile, dinitrosopentamethylenetetramine, 4,4'-oxybisbenzene-sulfonyl hydrazide or paratoluenesulfonyl hydrazide, or an inorganic one such as sodium bicarbonate, ammonium carbonate, sodium borohydride or silicon oxyhydride. These blowing agents may be used by themselves or as a mixture of two or more. When the blowing agent used has a high decomposition temperature, the use of an expansion aid such as zinc oxide is effective in lowering the decomposition temperature. In the coating composition of the present invention, it is desirable to use several kinds of crosslinking agents together with an expansion aid for reasons of broadening the temperature range in which the composition is able to be expanded and of permitting the expansion to proceed uniformly even when the temperature at which the expansion is performed fluctuates.

It is important that a mixture of a solid plasticizer with a liquid plasticizer should be incorporated into the powder coating composition. The solid plasticizer is selected from triphenyl phosphate and a first ester having the following general formulas (IV) and (V):

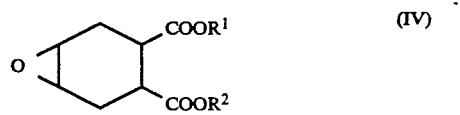

wherein $R^1$ and $R^2$ represent independently from each other an alkyl group having 12 or more carbon atoms, preferably 14–22 carbon atoms. The liquid plasticizer is selected from dioctyl phthalate and a second ester having the following general formula:

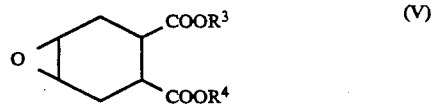

wherein $R^3$ and $R^4$ represent independently from each other an alkyl group having 1–10 carbon atoms, preferably 5–9 carbon atoms. The mixed plasticizer is preferably used in an amount of 5–60 parts by weight, more preferably 10–50 parts by weight, per 100 parts by weight of the thermoplastic resin. The weight ratio of the solid plasticizer to the liquid one is preferably 1:10 to 2:1, more preferably 1:8–1:1.

The coating composition may further contain various additives such as a filler, a wax, a coloring agent, a free flow improving agent and an antioxidant.

As the fillers, both organic and inorganic ones may be used. Examples of suitable fillers include zirconium, talc, crystalline silica, fused silica, calcium carbonate, magnesia, calcium silicate, aluminum hydroxide, magnesium hydroxide, phenol resins and silicone resins. The viscosity of the coating composition in a molten state, and the diameter of cells and the mechanical strength of an expanded body obtained from the coating composition may be controlled by controlling the amount and the particle size of the filler to be added. These fillers preferably have a particle size of 104 μm or less (150 mesh or finer), more preferably 0.1–74 μm and are generally used in an amount of 10–150 parts by weight, preferably 20–100 parts by weight, per 100 parts by weight of the thermoplastic resin.

As a wax, it is recommended to use an oxidized paraffin wax, especially an amide-type, oxidized polyethylene wax since the powder coating composition containing such a wax gives an expanded coating having reduced moisture absorption.

The coating composition may be obtained by mixing and kneading the above components with each other at a temperature higher than the melting point of the resin, pelleticizing the kneaded mixture, and grinding the pellets. In order to prevent the occurrence of expansion during the mixing stage, a mixing temperature of less than the decomposition temperature of the blowing agent is adopted. Further, the mixing is desired to be carried out at a temperature lower than the temperature at which the cross-linking occurs so that the occurrence of cross-linking is substantially prevented.

The coating composition preferably has such a particle size distribution that the content of particles with a particle size of 40 mesh (Tyler) or finer is 100% by weight, the content of particles with a particle size of 200 mesh or finer is at least 50% by weight and the content of particles with a particle size of 325 mesh or finer is not greater than 50% by weight, for the purpose of improving the free flow property of the coating composition and thereby facilitating the deposition of the coating composition onto a substrate during the powder coating stage.

Coating of a substrate with the coating composition is carried out in a manner known per se at a temperature sufficient to decompose the blowing agent, to cross-link the resin and to cause said coating composition to expand, thereby to form a layer of the expanded resin over the surface of the substrate. The powder coating may, for example, be carried out by contacting a surface of a substrate preheated to a temperature higher than the decomposition temperature of the blowing agent with a fluidized mass of the coating composition. By this, the powder of the coating composition deposits on the surface of the substrate and the deposits are melted and undergo both cross-linking and expansion, thereby forming a foamed layer.

The substrate may be formed of a metal such as aluminum, iron, copper or an alloy thereof, a synthetic resin such as a polypropylene, a polyamide or a polyester or a ceramic and may be in any desired form such as a plate, a sheet, a tube, a bent tube, a block, a box or a sphere. For example, when a metal tube is used as the substrate, there may be obtained a thermally insulated, sheathed tube to be used, for example, for connection to respective parts of air conditioners, such as compressors, condensers, expanders and evaporators, through which a cooling or heating medium is passed. When a box is used as the substrate, there may be obtained a thermally insulated box to be used, for example, for containing a cooling or heating medium of a car air conditioner or for accommodating a cooling unit and an evaporator (heat-exchanger) of a car air conditioner. The coating composition is also utilized for sound proofing or cushioning purposes.

The expansion ratio of the foamed layer may be controlled by the amount of the blowing agent in the coating composition and is preferably 2–20, more preferably 3–10. The thickness of the foamed layer is generally 1–15 mm, preferably 2–8 mm.

The following examples will further illustrate the present invention.

EXAMPLE 1

To 40 parts by weight of an ethylene/vinyl acetate copolymer (vinyl acetate content: 30% by weight, melt flow index: 18 g/minute) were mixed 80 parts by weight of calcium carbonate as a filler and 35 parts by weight of dioctyl phthalate as a liquid plasticizer, and the mixture was extruded at 150° C. into pellets. To the thus obtained pellets were mixed 60 parts by weight of a partially saponified ethylene/vinyl acetate copolymer (saponification degree: 80%), 5 parts by weight of azodicarbonamide as a blowing agent, a blend of another 5 parts by weight of azodicarbonamide and 3 parts by weight of zinc oxide as an expansion aid, 10.7 parts by weight (NCO/OH equivalent ratio: 0.5) of a blocked isocyanate having the formula (III) and 1.7 parts by weight of dicumylperoxide both as a cross-linking agent, 15 parts by weight of triphenyl phosphate as a solid plasticizer and 0.5 parts by weight of carbon black as a coloring agent. The thus obtained mixture was mixed in a wet state and then extruded at a temperature of 120° C. with an extruder to form pellets. The pellets were ground at −80° C. to obtain a coating composition in the form of fine powder.

The thus obtained powder coating composition was coated over the outer surface of an aluminum tube (diameter: 20 mm, length: 200 mm) and the coating was heated in an oven maintained at 150° C. for 20 minutes to effect the cross-linking and expansion. The foamed layer was found to be closely contacted with the aluminum surface and to have an elongation of 130–140%, an expansion ratio of 2.5–3 and fine and uniform cells. The layer also had a good cushioning property (elasticity).

For the purpose of evaluating the easiness of powder coating, an aluminum pipe having a length of 30 cm and a diameter of 8 mm and preheated to 150° C. was dipped in a fluidized mass of the above coating composition for 3 seconds. The amount of the coating composition which deposited on the aluminum pipe was found to be 8.5 g.

The powder coating composition was also applied to a surface of an iron plate (600×600×3 mm) which had been coated with a releasing agent and preheated to 130° C., thereby obtaining an unexpanded, non-cross-linked coating with a thickness of about 1 mm. The coating was then heated at 150° C. for 25 minutes to obtain a foamed sheet whose hardness (in accordance with JIS K6301), tensile strength (JIS K6301), elongation (JIS K6301), moisture absorption and hot water absorption were as shown in Table 1. The moisture absorption and hot water absorption were measured as follows:

Moisture Absorption

Sample foamed sheet (5 ×5 cm) is immersed in distilled water, contained in a vessel, at a depth of 5 cm from the water surface. The inside of the vessel is then evacuated to a reduced pressure of 125 mmHg. The sample is maintained at that pressure for 3 minutes. The resulting sample is taken out of the vessel and is allowed to stand in the ambient atmosphere for another 3 minutes. The surface of the sample is wiped with an absorbing paper and the weight ($W_1$) of the sample is measured. The above test is carried out at room temperature. Moisture absorption is calculated as follows:

Moisture absorption = $((W_1 - W_0)/W_0) \times 100$ (%)

wherein $W_0$ is the weight of the sample before the test.

Hot Water Absorption

Hot water absorption is measured in the same manner as that in the above Moisture Absorption except that distilled water has a temperature of 80° C. and that the sample is maintained in the reduced pressure in the hot distilled water for 22 hours.

EXAMPLES 2-7

Example 1 was repeated in the same manner as described except that the amounts and ingredients of the coating compositions were varied as shown in Table 1.

COMPARATIVE EXAMPLES 1-7

Example 1 was repeated in the same manner as described except that the amounts and ingredients of the coating compositions were varied as shown in Table 2.

Remarks *1-*3 in Tables 1 and 2 are as follows:
*1: RIKA RESIN E-8, the compound of the formula (V) in which $R^3$ and $R^4$ are $C_8H_{17}$
*2: RIKAFLOW, the compound of the formula (IV) in which $R^1$ and $R^2$ are $C_{18}H_{37}$, melting point: 50°–58° C.
*3: Ceridust 9615A, amide-type oxidized polyethylene wax

TABLE 1

| | Example | | | | | | |
|---|---|---|---|---|---|---|---|
| | 1 | 2 | 3 | 4 | 5 | 6 | 7 |
| Saponified EVA | 60 | 60 | 60 | 60 | 60 | 60 | 60 |
| EVA | 40 | 40 | 40 | 40 | 40 | 40 | 40 |
| Blocked ICN | 10.7 | 10.7 | 10.7 | 10.7 | 10.7 | 10.7 | 11.4 |
| Peroxide | 1.5 | 1.5 | 1.5 | 1.5 | 1.5 | 1.5 | 1.5 |
| Azodicarbonamide | 10 | 10 | 10 | 10 | 10 | 10 | 10 |
| Zinc oxide | 3 | 3 | 3 | 3 | 3 | 3 | 3 |
| DOP | 35 | 35 | — | — | 35 | 35 | 20 |
| RIKARESIN *1 | — | — | 20 | 30 | — | — | — |
| TPP | 10 | — | 5 | — | 10 | 10 | 5 |
| RIKAFLOW *2 | — | 10 | — | 10 | — | — | — |
| CaCO₃ | 80 | 80 | 80 | 80 | 80 | 80 | 80 |
| Carbon black | 0.5 | 0.5 | 0.5 | 0.5 | 0.5 | 0.5 | 0.5 |
| Polyol | — | — | — | — | — | — | 15 |
| Paraffin Wax | — | — | — | — | 2.0 | — | — |
| Oxidized Wax *3 | — | — | — | — | — | 2.0 | — |
| Expansion Ratio | 2.7 | 2.6 | 2.5 | 2.4 | 2.7 | 2.5 | 2.4 |
| Hardness | 31 | 33 | 32 | 35 | 31 | 31 | 30 |
| Tensile Strength | 10.4 | 10.6 | 10.8 | 11.0 | 10.7 | 10.7 | 10.5 |
| Breaking Elongation | 135 | 125 | 100 | 140 | 130 | 135 | 129 |
| Moisture Absorption | 41 | 39 | 35 | 37 | 40 | 20 | 45 |
| Hot Water Absorption | 32 | 30 | 28 | 32 | 31 | 22 | 40 |
| Amount of Powder | 8.5 | 8.0 | 7.7 | 8.2 | 8.5 | 8.6 | 8.5 |

TABLE 2

| | Comptv. Ex. | | | | | | |
|---|---|---|---|---|---|---|---|
| | 1 | 2 | 3 | 4 | 5 | 6 | 7 |
| Saponified EVA | 60 | 60 | 60 | 60 | 60 | 60 | 60 |
| EVA | 40 | 40 | 40 | 40 | 40 | 40 | 40 |
| Blocked ICN | 10.7 | 10.7 | 10.7 | 10.7 | 10.7 | 10.7 | 10.7 |
| Peroxide | 1.5 | 1.5 | 1.5 | 1.5 | 1.5 | 1.5 | 1.5 |
| Azodicarbonamide | 10 | 10 | 10 | 10 | 10 | 10 | 10 |
| Zinc oxide | 3 | 3 | 3 | 3 | 3 | 3 | 3 |
| DOP | — | 20 | — | — | — | 35 | — |
| RIKARESIN *1 | — | — | 20 | — | — | — | — |
| TPP | — | — | — | 10 | — | — | 20 |
| RIKAFLOW *2 | — | — | — | — | 10 | — | — |
| CaCO₃ | 80 | 80 | 80 | 80 | 80 | 80 | 80 |
| Carbon black | 0.5 | 0.5 | 0.5 | 0.5 | 0.5 | 0.5 | 0.5 |
| Polyol | — | — | — | — | — | — | — |
| Paraffin Wax | — | — | — | — | — | — | — |
| Oxidized Wax *3 | — | — | — | — | — | — | — |
| Expansion Ratio | 2.3 | 2.5 | 2.2 | 2.4 | 2.2 | 2.6 | 2.5 |
| Hardness | 41 | 37 | 44 | 39 | 38 | 35 | 37 |
| Tensile Strength | 13.7 | 11.6 | 14.0 | 11.9 | 12.2 | 10.8 | 11.3 |
| Breaking Elongation | 125 | 139 | 140 | 143 | 136 | 144 | 150 |
| Moisture Absorption | 92 | 54 | 50 | 48 | 65 | 50 | 45 |
| Hot Water Absorption | 89 | 51 | 51 | 81 | 59 | 47 | 95 |
| Amount of Powder | 6.0 | 6.8 | 6.5 | 7.5 | 7.2 | 7.3 | 8.2 |

What is claimed is:

1. An expandable, powder coating composition comprising:
   (a) a thermoplastic resin containing a hydroxyl group-containing polymer;
   (b) a cross-linking agent containing a polyisocyanate compound which is capable of reacting with the hydroxyl groups of said polymer at a temperature higher than the melting point of said thermoplastic resin to crosslink said polymer and which is solid at room temperature;
   (c) a blowing agent capable of decomposing and generating a gas when heated to a temperature higher than the melting point of said thermoplastic resin; and
   (d) a mixture of solid and liquid plasticizers, said solid plasticizer being selected from the group consisting of triphenyl phosphate and a first ester having the following general formula:

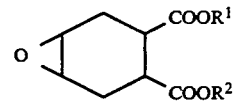

wherein $R^1$ and $R^2$ represent independently from each other an alkyl group having 12 or more carbon atoms, said liquid plasticizer being selected from the group consisting of dioctyl phthalate and a second ester having the following general formula:

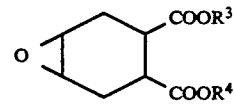

wherein $R^3$ and $R^4$ represent independently from each other an alkyl group having 1-10 carbon atoms.

2. A composition as claimed in claim 1, further comprising an oxidized paraffin wax.

3. A composition as claimed in claim 1, wherein said first ester has the formula:

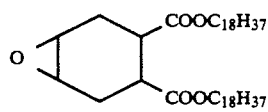

and said second ester has the formula:

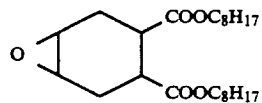

4. A composition as claimed in claim 1, further comprising a filler.

5. A composition as claimed in claim 1, further comprising a polyol compound.

6. A composite material obtained by a method comprising the step of powder coating a substrate with a composition according to claim 1 at a temperature sufficient to decompose said blowing agent and to cause said coating composition to expand, thereby to form a layer of an expanded resin over the surface of the substrate.

7. The coating composition of claim 1 wherein the weight ratio of said solid plasticizer to said liquid plasticizer is 1:10 to 2:1.

8. The coating composition of claim 1 wherein the weight ratio of said solid plasticizer to said liquid plasticizer is 1:8 to 1:1.

9. The coating composition of claim 1 wherein said mixture of plasticizers is present in the amount of 5–60 parts by weight per 100 parts by weight of said thermoplastic resin.

10. The coating composition of claim 1 wherein said mixture of plasticizers is present in the amount of 10–50 parts by weight per 100 parts by weight of said thermoplastic resin.

* * * * *